(12) United States Patent
Dawson et al.

(10) Patent No.: US 10,697,336 B2
(45) Date of Patent: Jun. 30, 2020

(54) FLUID SYSTEM

(71) Applicants: Castrol Limited, Berkshire (GB);
Christopher Dawson, Royston (GB);
Steven Paul Goodier, Berkshire (GB);
Gary Howard, Royston (GB); Adrian Michael Woodward, Royston (GB)

(72) Inventors: Christopher Dawson, Royston (GB);
Steven Paul Goodier, Berkshire (GB);
Gary Howard, Royston (GB); Adrian Michael Woodward, Royston (GB)

(73) Assignee: Castrol Limited, Reading (GB)

( * ) Notice: Subject to any disclaimer, the term of this patent is extended or adjusted under 35 U.S.C. 154(b) by 316 days.

(21) Appl. No.: 15/312,604

(22) PCT Filed: May 21, 2015

(86) PCT No.: PCT/EP2015/061336
§ 371 (c)(1),
(2) Date: Nov. 18, 2016

(87) PCT Pub. No.: WO2015/177318
PCT Pub. Date: Nov. 26, 2015

(65) Prior Publication Data
US 2017/0089235 A1 Mar. 30, 2017

(30) Foreign Application Priority Data
May 21, 2014 (GB) .................................. 1409066.6

(51) Int. Cl.
*F01M 11/02* (2006.01)
*F01M 11/04* (2006.01)
(Continued)

(52) U.S. Cl.
CPC ......... *F01M 11/02* (2013.01); *F01M 11/0004* (2013.01); *F01M 11/04* (2013.01);
(Continued)

(58) Field of Classification Search
CPC .... F01M 11/0004; F01M 11/02; F01M 11/04; F01M 2011/0483; F02F 7/0068;
(Continued)

(56) References Cited

U.S. PATENT DOCUMENTS 2,103,063 A   12/1937  Clark
3,972,387 A *  8/1976  Braun ...................... F04B 9/14
                                                    184/28
(Continued)

FOREIGN PATENT DOCUMENTS

CN         1354319       6/2006
CN       101903076      12/2010
(Continued)

*Primary Examiner* — Stephen K Cronin
*Assistant Examiner* — Ruben Picon-Feliciano
(74) *Attorney, Agent, or Firm* — McDonnell Boehnen Hulbert & Berghoff LLP (57) ABSTRACT

In one embodiment, there is provided a dock for a replaceable fluid container for an engine, the fluid container having: a fluid reservoir; and at least one fluid port having a coupling adapted to couple with a fluid circulation system associated with the engine; the dock having: a fastening mechanism configured to cooperate with the container such that, as the container is inserted into the dock, the fastening mechanism acts first to seat the fluid container in the dock but in an undocked condition and then, as the container is inserted further into the dock, acts to bring the fluid container into an engaged condition in which the fluid container is docked with a docking interface of the dock.

37 Claims, 7 Drawing Sheets

(51) Int. Cl.
*F16N 37/00* (2006.01)
*F16N 19/00* (2006.01)
*F01M 11/00* (2006.01)
*F02F 7/00* (2006.01)
*F16N 21/00* (2006.01)

(52) U.S. Cl.
CPC .......... *F02F 7/0068* (2013.01); *F16N 19/003* (2013.01); *F16N 37/00* (2013.01); *F01M 2011/0483* (2013.01); *F16N 21/00* (2013.01); *F16N 2230/02* (2013.01)

(58) Field of Classification Search
CPC .... F16N 19/003; F16N 21/00; F16N 2230/02; F16N 37/00
See application file for complete search history.

(56) References Cited

U.S. PATENT DOCUMENTS

| | | | |
|---|---|---|---|
| 4,075,099 A | | 2/1978 | Pelton et al. |
| 4,151,823 A | * | 5/1979 | Grosse .............. F01M 11/03 123/196 A |
| 4,676,287 A | | 6/1987 | Fitzwater |
| 5,454,354 A | | 10/1995 | Miller |
| 5,476,390 A | | 12/1995 | Taguchi et al. |
| 6,048,454 A | * | 4/2000 | Jenkins .............. B01D 29/114 210/172.1 |
| 9,869,219 B2 | | 1/2018 | Barnes et al. |
| 9,878,822 B2 | | 1/2018 | Barnes et al. |
| 2007/0132819 A1 | | 6/2007 | Umeda et al. |
| 2011/0232785 A1 | * | 9/2011 | Takahashi ......... F01M 11/0004 137/561 R |
| 2011/0253092 A1 | | 10/2011 | Springer et al. |
| 2015/0191156 A1 | * | 7/2015 | Kiser .................. B60S 3/00 220/737 |
| 2015/0001140 A1 | | 10/2015 | Reckin et al. |
| 2015/0291317 A1 | | 10/2015 | Brett et al. |
| 2015/0292372 A1 | | 10/2015 | Barnes et al. |
| 2015/0292674 A1 | | 10/2015 | Brett et al. |
| 2017/0089234 A1 | | 3/2017 | Dawson et al. |
| 2017/0089236 A1 | | 3/2017 | Andersen et al. |
| 2017/0101911 A1 | | 4/2017 | Barnes et al. |
| 2017/0107873 A1 | | 4/2017 | Ali et al. |
| 2017/0122151 A1 | | 5/2017 | Brett et al. |
| 2017/0183992 A1 | | 6/2017 | Barnes et al. |
| 2017/0190466 A1 | | 7/2017 | Andersen et al. |
| 2017/0197596 A1 | | 7/2017 | Barnes et al. |
| 2018/0258805 A1 | | 9/2018 | Goodier et al. |
| 2018/0258806 A1 | | 9/2018 | Butterworth et al. |
| 2018/0266873 A1 | | 9/2018 | Goodier et al. |
| 2018/0274408 A1 | | 9/2018 | Goodier et al. |
| 2019/0257229 A1 | | 8/2019 | Goodier et al. |

FOREIGN PATENT DOCUMENTS

| | | |
|---|---|---|
| DE | 10 2006 005529 | 8/2007 |
| DE | 102012024365 | 6/2014 |
| EP | 1352748 | 10/2003 |
| FR | 2 803 872 | 7/2001 |
| JP | S54 42140 | 3/1979 |
| JP | S55 94624 | 7/1980 |
| JP | H11-028319 | 2/1999 |
| JP | 2002-212974 | 7/2002 |
| JP | 2003 042433 | 2/2003 |
| JP | 2006-242160 | 9/2006 |
| JP | 2010-282614 | 12/2010 |
| JP | 2011-085251 | 4/2011 |
| WO | 2001/053663 | 7/2001 |
| WO | 2003/106598 | 2/2003 |
| WO | WO 2003/106598 | 12/2003 |
| WO | 2014/076316 | 5/2014 |
| WO | WO 2015/177318 | 11/2015 |
| WO | WO 2016/158971 | 10/2016 |

* cited by examiner

FLUID SYSTEM

CROSS REFERENCE TO RELATED APPLICATIONS

The present application is a National Phase application of, and claims the benefit of, International (PCT) Application No. PCT/EP2015/061336, filed on May 21, 2015, which claims priority to GB Application No. 1409066.6, filed on May 21, 2014, the entire contents of both which are incorporated herein by reference.

This invention relates to a dock and corresponding methods, and in particular to a dock for a replaceable fluid container for an engine and a method of supplying fluid to a vehicle engine.

Many vehicle engines use one or more fluids for their operation. Such fluids are often liquids. For example, internal combustion engines use liquid lubricating oil compositions. Also, electric engines use heat exchange liquids for example to cool the engine and/or to heat the engine, and/or to cool and heat the engine during different operating conditions. Such fluids are generally held in reservoirs associated with the engine and may require periodic replacement.

Conventional periodic replacement of engine lubricating oil composition in a vehicle engine usually involves draining the composition from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil composition. This is complex and expensive.

Aspects of the disclosure address or at least ameliorate at least one of the above issues.

In an aspect of the present disclosure, there is provided a dock for a replaceable fluid container for an engine, the fluid container comprising: a fluid reservoir; and at least one fluid port comprising a coupling adapted to couple with a fluid circulation system associated with the engine; the dock comprising: a fastening mechanism configured to cooperate with the container such that, as the container is inserted into the dock, the fastening mechanism acts first to seat the fluid container in the dock but in an undocked condition and then, as the container is inserted further into the dock, acts to bring the fluid container into an engaged condition in which the fluid container is docked with a docking interface of the dock.

The fastening mechanism may comprise an actuator configured to cooperate with a complementary fastening mechanism of the fluid container, the actuator being configured to be operated between: a first condition where the actuator is configured to abut with the complementary fastening mechanism of the fluid container to hold the fluid container such that the port of the container is in the undocked condition from the docking interface of the dock; or a second condition where the actuator is fastened to the complementary fastening mechanism of the fluid container. The actuator may comprise at least one lever; and the complementary fastening mechanism may comprise a lever engaging surface configured to cooperate with the lever. The actuator may be configured to be movable with respect to the docking interface in order to guide the fluid container from the undocked condition into the engaged condition. The actuator may be configured to be movable with respect to the docking interface in order to guide the fluid container from the engaged condition to the undocked condition. The actuator may be configured to guide the fluid container from the undocked condition to the engaged condition in a direction normal to the docking interface of the dock. The actuator may be configured to guide the fluid container from the engaged condition to the undocked condition in a direction normal to the docking interface of the dock.

The actuator may comprise a handle coupled to the lever and configured to be operated by a user to cause the actuator to be operated from the first condition to the second condition. The actuator may comprise a handle coupled to the lever and configured to be operated by a user to cause the actuator to be operated from the second condition to the first condition. The handle may further be configured to cover at least partly a part of the fluid container when the container is in the engaged condition.

In the first condition, the actuator may be configured to abut with the complementary fastening mechanism located at a part of the fluid container arranged to be docked to the docking interface of the dock in the engaged condition.

The dock may further comprise a receiver for accommodating the fluid container in the undocked condition and in the engaged condition. The receiver may comprise an asymmetric engaging mechanism configured to cooperate with a complementary asymmetric engaging mechanism of the fluid container, such that the fluid container may be accommodated in only one spatial orientation with respect to the dock. The asymmetric engaging mechanism may comprises a first number of patterns provided in one part of the receiver; and a second, different, number of patterns provided in another part of the receiver. The asymmetric engaging mechanism may comprise at least one pattern with a first shape provided in one part of the receiver; and at least one pattern with a second, different, shape provided in another part of the receiver. The asymmetric engaging mechanism may comprise at least one pattern with a first dimension provided in one part of the receiver; and at least one pattern with a second, different, dimension provided in another part of the receiver. The asymmetric engaging mechanism may be tapered towards the docking interface of the dock, such that the asymmetric engaging mechanism is configured to provide clearance between the asymmetric engaging mechanism of the dock and the complementary asymmetric engaging mechanism of the fluid container for enabling a user to engage the complementary asymmetric engaging mechanism of the fluid container with the asymmetric engaging mechanism of the dock; and to guide the fluid container from the undocked condition into the engaged condition into the docking interface.

The dock may further comprise at least one fluid port comprising a coupling adapted to connect to a corresponding coupling on the fluid container.

The dock may further comprise an interface for data communication with a data provider of the fluid container.

The fastening mechanism may be configured to hold the fluid container such that in the undocked condition the container is spaced from the docking interface of the dock.

The dock may further comprise a guiding mechanism configured to guide the fluid container toward a position seated within the dock to enable the fluid container to be docked to a docking interface of the dock in an engaged condition.

The reservoir may hold a lubricant for a lubricant circulation system associated with the engine.

In another aspect of the present disclosure, there is provided a dock for a replaceable fluid container for an engine, the fluid container comprising:
  at least one fluid port comprising a coupling adapted to connect to a corresponding coupling on the engine to connect the fluid container in fluidic communication with a fluid circulation system associated with the engine; and
  a data provider arranged for data communication with a control device when the container is engaged with the dock;
the dock comprising:
an actuator comprising at least two levers provided on opposing parts of the actuator and configured to cooperate with two corresponding lever engaging surfaces of the fluid container;
  wherein the levers are configured to cause the container to cooperate with the dock in:
  a undocked condition, where the levers are configured to hold the fluid container such that the fluid port of the container is in an undocked condition from a docking interface of the dock; or
  an engaged condition where the data provider is arranged for data communication with the control device, where the levers are configured to hold the fluid container in a docked condition with the docking interface of the dock; and
  a handle coupled to the levers and configured to be operated by a user to cause the levers to be operated from a first condition where the levers are configured to abut with the lever engaging surfaces located at a part of the fluid container arranged to be docked to the docking interface of the dock in the engaged condition of the fluid container; or a second condition where the levers are fastened to the lever engaging surfaces of the fluid container.

In another aspect of the present disclosure, there is provided a dock for a replaceable fluid container for an engine,
  the fluid container comprising:
    a fluid reservoir; and
    at least one fluid port comprising a coupling adapted to couple with a fluid circulation system associated with the engine; and the dock comprising:
    a guiding mechanism configured to guide the fluid container toward a position seated within the dock to enable the fluid container to be docked to a docking interface of the dock in an engaged condition.

The guiding mechanism may further be configured to guide disengagement of the fluid container from the dock from the engaged condition to the undocked condition. The guiding mechanism may comprise an actuator configured to cooperate with a complementary guiding mechanism of the fluid container, the actuator being configured to be operated between: a first condition where the actuator is configured to abut with the complementary guiding mechanism of the fluid container to hold the fluid container such that the port of the container is in an undocked condition from a docking interface of the dock; or a second condition where the actuator is fastened to the complementary guiding mechanism of the fluid container. The dock may be configured to guide the fluid container from the undocked condition to the engaged condition in a direction normal to the docking interface of the dock. The dock may be configured to guide the fluid container from the engaged condition to the undocked condition in a direction normal to the docking interface of the dock.

The dock may further comprise a receiver for accommodating the fluid container in the undocked condition and in the engaged condition. The receiver may comprise an asymmetric engaging mechanism configured to cooperate with a complementary asymmetric engaging mechanism of the fluid container, such that the fluid container may be accommodated in only one spatial orientation with respect to the dock. The asymmetric engaging mechanism may be tapered towards the docking interface of the dock, such that the asymmetric engaging mechanism is configured to provide clearance between the asymmetric engaging mechanism of the dock and the complementary asymmetric engaging mechanism of the fluid container for enabling a user to engage the complementary asymmetric engaging mechanism of the fluid container with the asymmetric engaging mechanism of the dock; and to guide the fluid container from the undocked condition into the engaged condition into the docking interface.

The dock may further comprise at least one fluid port comprising a coupling adapted to connect to a corresponding coupling on the fluid container to connect the fluid container in fluidic communication with the fluid circulation system associated with the engine.

The dock may further comprise an interface for data communication with a data provider of the fluid container.

The reservoir may hold a lubricant for a lubricant circulation system associated with the engine.

In another aspect of the present disclosure, there is provided a method of inserting a replaceable fluid container for an engine in a dock,
  the fluid container comprising:
    a fluid reservoir; and
    at least one fluid port comprising a coupling adapted to couple with a fluid
  circulation system associated with the engine;
  the method comprising a fastening mechanism of the dock, configured to cooperate with the container:
    acting first to seat the fluid container in the dock but in an undocked condition, and
    then, as the container is inserted further into the dock, acting to bring the fluid container into an engaged condition in which the fluid container is docked with a docking interface of the dock.

In another aspect of the present disclosure, there is provided a method of guiding a replaceable fluid container for an engine into a dock,
  the fluid container comprising:
    a fluid reservoir; and
    at least one fluid port comprising a coupling adapted to couple with a fluid circulation system associated with the engine;
  the method comprising a guiding mechanism of the dock, configured to cooperate with the container:
guiding the fluid container toward a position seated within the dock to enable the fluid container to be docked to a docking interface of the dock in an engaged condition.

The disclosure extends to:
  a replaceable fluid container configured to cooperate with a dock of any aspect of the disclosure, and/or
  a system comprising a dock of any aspect of the disclosure and a replaceable fluid container configured to cooperate with a dock of any aspect of the disclosure, and/or
  a method of providing a fluid to a vehicle engine and/or a method of inserting a container in a dock of any aspect of the disclosure.

The disclosure extends to methods and/or containers and/or docks and/or systems substantially as herein described with reference to the accompanying drawings.

Any feature in one aspect of the disclosure may be applied to other aspects of the disclosure, in any appropriate combination. In particular, features of method aspects may be applied to containers and/or docks and/or systems aspects, and vice versa.

Embodiments will now be described, by way of example only, with reference to the accompanying drawings, in which.

Common features are identified by common reference numerals. In the drawings, like reference numerals are used to indicate like elements.

Figure 1A:
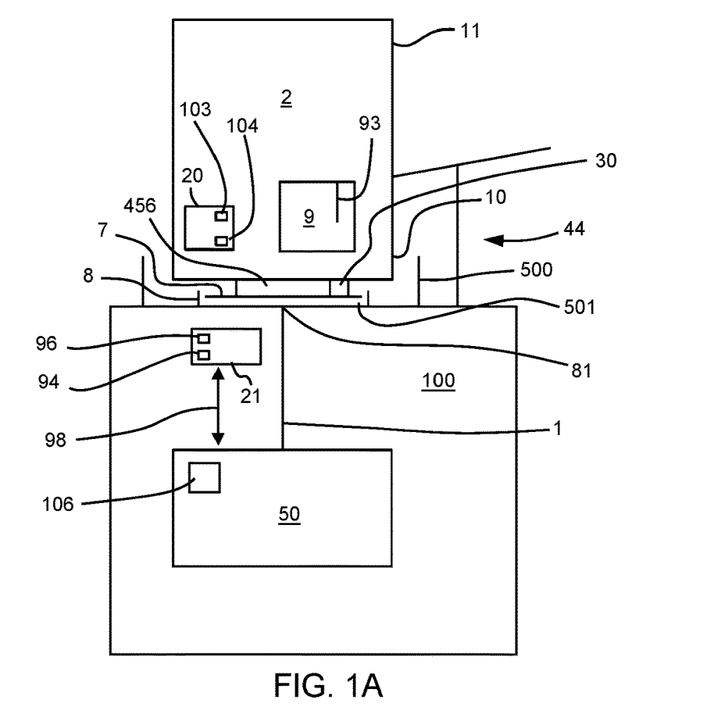
FIG. 1A shows a schematic illustration of a dock for a replaceable fluid container, in a disengaged condition.
Figure 1B:
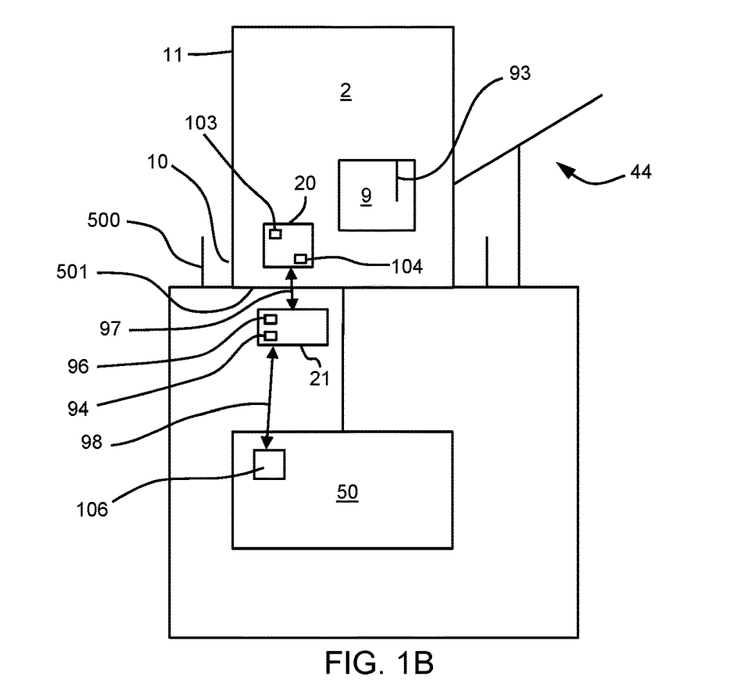
FIG. 1B shows a schematic illustration of a dock for a replaceable fluid container, in an engaged condition.

FIG. 1A and FIG. 1B schematically illustrate a dock 500 for a replaceable fluid container 2, for example for providing fluid to an engine 50. The engine 50 may be for example an engine of a vehicle 100.

The fluid container 2, described in more detail below, comprises a first end 10 and a second end 11. The container 2 also comprises at least one fluid port 456 provided in the first end 10 and comprising a coupling 7 adapted to connect to a corresponding coupling 8 on the vehicle 100. As will be explained in greater detail below, the container 2 may comprises for example three fluid ports or more. The connection between the coupling 7 and the coupling 8 is configured to connect the fluid container 2 in fluidic communication with a fluid circulation system 1 of the engine 50.

Figure 2A:
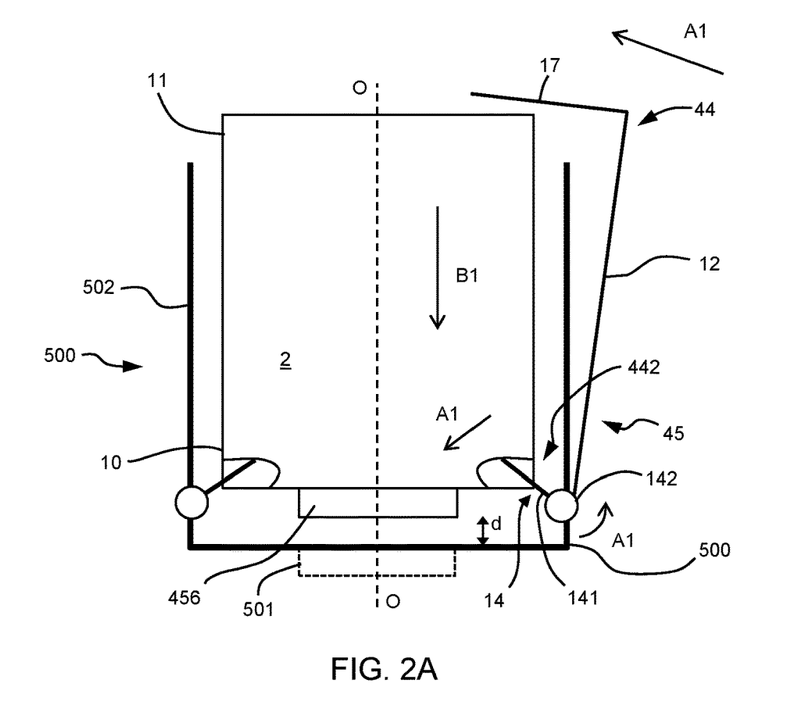
FIG. 2A shows a schematic illustration of a fastening and/or guiding mechanism of dock with an actuator in a first condition.

In the examples illustrated in FIGS. 1A and 2A, the port 456 is shown as being a male element and the coupling 8 as a female element. It is understood that the port 456 may be a female element and the coupling 8 as a male element, as explained in reference to FIG. 5 and FIG. 6.

In some non-limiting examples, the fluid container 2 may also comprise a data provider 20 arranged for data communication with a control device 21 of the vehicle 100 when the container 2 is engaged with the dock 500 (FIG. 1B). The data provider 20 is described in greater detail below.

In some examples, the fluid container 2 comprises a reservoir 9 for holding a fluid 3. The reservoir 9 of the container 2 may be pre-filled with the fluid 3 before the container 2 is inserted in the dock 500.

The fluid 3 may be any type of fluid circulated in the engine 50 and/or circulated in any fluid circulation system associated with the engine 50 (that is the fluid is not necessarily circulated in the engine 50) to support a function of the engine 50 and/or the vehicle 100. The function may be an ancillary function of the engine 50. For example the fluid 3 may be lubricant, and/or coolant, and/or de-icer, and/or any hydraulic fluid such as a fluid used in braking systems, and/or a pneumatic fluid, a washer fluid, a fuel additive or any other fluid associated with any function of the engine and/or the vehicle. Many different types and grades of such fluid are available. As already mentioned, in some non-limiting examples, the fluid 3 may be an engine lubricating oil composition or an engine heat exchange fluid.

As illustrated in FIGS. 1A and 2A, in a disengaged condition, the container 2 may be conveniently seated in the dock 500 and/or removed from the dock 500 by a user and/or operator.

To that effect, the dock 500 comprises a fastening mechanism 44 configured to cause the container 2 to cooperate with the dock 500 in the disengaged condition (FIG. 1A).

In the disengaged condition, the fastening mechanism 44 is configured to hold the fluid container 2 such that the fluid port 456 of the container 2 is in an undocked condition from a docking interface 501 of the dock 500. For example, in the undocked condition, the container 2 and the docking interface 501 are not fastened to each other, for instance the container 2 and the docking interface 501 may be just touching or be spaced from each other. In the undocked condition, the container 2 is inserted into the dock 500, and the fastening mechanism 44 is configured to act first to seat the fluid container 2 in the dock 500 but in the undocked condition.

The fastening mechanism 44 of the disclosure may thus enable easy insertion and/or removal of the container 2 from the dock 500 in the disengaged condition.

The fastening mechanism 44 is also configured to cause the container 2 to cooperate with the dock 500 in an engaged condition (FIG. 1B).

In the engaged condition, the fastening mechanism 44 is configured to hold the fluid container 2 in a docked condition with the docking interface 501 of the dock 500. In the engaged condition, the container 2 cannot be conveniently removed from the dock 500 by a user and/or operator. The fastening mechanism 44 is thus configured to cooperate with the container 2 such that, as the container 2 is inserted further into the dock 500, the fastening mechanism 44 is configured to act to bring the fluid container 2 into an engaged condition in which the fluid container 2 is docked with the docking interface 501 of the dock 500.

In some non-limiting examples, in the engaged condition, the data provider 20 may be arranged for data communication with the control device 21.

In some non-limiting examples, the fastening mechanism 44 may further act as a locking mechanism, as explained in greater detail below.

Figure 2B:
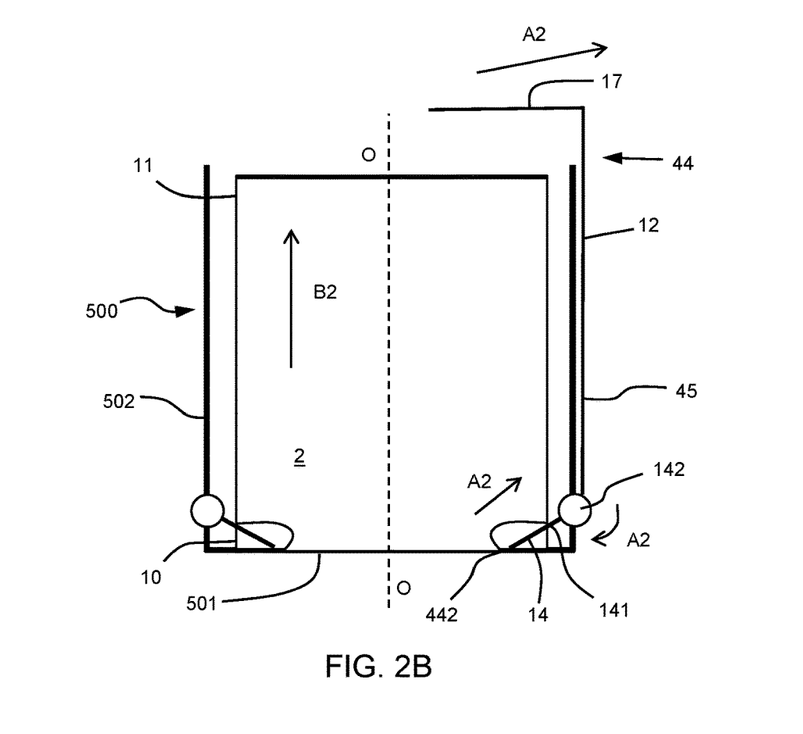
FIG. 2B shows a schematic illustration of a fastening and/or guiding mechanism of dock with an actuator in a second condition.

As schematically illustrated in FIG. 2A and FIG. 2B, the fastening mechanism 44 may comprise an actuator 45 configured to cooperate with a complementary fastening mechanism 442 of the fluid container 2.

The actuator 45 may be configured to be operated between a first condition (FIG. 2A) and/or a second condition (FIG. 2B).

In the first condition, the container 42 may be conveniently seated in and/or removed from the dock 500 by the user and/or operator.

To that effect, in the first condition, the actuator 45 is configured to abut with the complementary fastening mechanism 442 of the fluid container 2, in order to hold the fluid container 2 such that the port 456 of the container 2 is in an undocked condition from a docking interface 501 of the dock 500.

In the second condition, the actuator 45 is fastened to the complementary fastening mechanism 442 of the fluid container 2, for example using cooperating fastening mechanisms, such as latches, on the container 2 and on the docking interface 501, such as resilient and/or biased mechanisms cooperating and/or interlocking with conforming and/or cooperating mechanisms, such as indents and/or grooves. As a result, in the second condition of the actuator 45, the container 2 cannot be removed from the dock 500. The actuator 45 needs to be in the first condition to enable the container 2 to be removed from the dock 500.

In some examples, the actuator 45 may comprise at least one lever 14. The lever 14 may be any type of fastening arm or linkage with the container 2, such as for example a cam. As a non-limiting example, the lever 14 may comprise a shaft 142, mounted to be able to rotate with respect to the docking interface 501, and at least one arm 141 provided on the rotating shaft 142.

The complementary fastening mechanism 442 of the container 2 may comprise a lever engaging surface 442 configured to cooperate with the lever 14. The lever engaging surface 442 may be any type of cooperating surface. As a non-limiting example, the lever engaging surface 442 may comprise an arm engaging surface 142 provided on the container 2, such as a groove provided on the container 2.

As schematically illustrated in FIGS. 2A and 2B, the actuator 45 is configured to be movable (as shown by arrows A1) with respect to the docking interface 501 in order to guide the fluid container 2 from the disengaged condition (FIG. 2A) into the engaged condition (FIG. 2B). As a non-limiting example, movement of the actuator 45 may cause the shaft 142 to rotate with respect to the docking interface 501. The rotation of the shaft 142 causes the arm 141 cooperating with the groove 142 to displace the container 2, to engage the container 2 with the docking interface 501, as shown by arrow B1.

Additionally or alternatively, in some examples, the actuator 45 may further be configured to be movable (as shown by arrows A2) with respect to the docking interface 501 in order to guide the fluid container 2 from the engaged condition (FIG. 2B) to the disengaged condition (FIG. 2A). As a non-limiting example, movement of the actuator 45 causes the shaft 142 to rotate with respect to the docking interface 501. The rotation of the shaft 142 causes the arm 141 cooperating with the groove 142 to displace the container 2 to disengage the container 2 from the docking interface 501, as shown by arrow B2.

In some examples, the actuator 45 is configured to guide the fluid container 2 from the disengaged condition (FIG. 2A) to the engaged condition (FIG. 2B) in a direction (as shown by arrow B1) normal to the docking interface 501 of the dock 500. To that effect, the dock 500 may comprise a guiding mechanism 44 configured to control engagement of the fluid container 2 into the dock 500 from the disengaged condition to the engaged condition.

Additionally or alternatively, the actuator 45 may be configured to guide the fluid container 2 from the engaged condition (FIG. 2B) to the disengaged condition (FIG. 2A) in a direction (as shown by arrow B2) normal to the docking interface 501 of the dock 501. To that effect, the dock 500 may comprise a guiding mechanism 44 configured to control disengagement of the fluid container 2 into the dock 500 from the engaged condition to the disengaged condition.

The actuator 45 of the fastening and/or guiding mechanism 44 of the disclosure may thus enable level displacement of the container 2 with respect to the dock 500, for example in a direction normal to the docking interface 501.

The level displacement of the container 2 with respect to the dock 500 may enable correct coupling of all of the fluid ports 456 of the container 2, therefore avoiding undesirable leakage of the container 2. The level displacement of the container 2 with respect to the dock 500 may enable simultaneous coupling of all of the fluid ports 456 of the container 2, therefore avoiding undesirable leakage of the container 2.

To that effect, the actuator 45 may comprise at least two levers 14 provided on opposing parts of the actuator 45. The at least two levers 14 may be operated simultaneously, for example with respect to a mid-plane (O-O) as shown in FIG. 2A and FIG. 2B. The at least two levers 14 may be configured to cooperate with two corresponding lever engaging surfaces 442 of the fluid container 2. The symmetrical location and the simultaneous movement of the two levers 14 with respect to the plane (O-O) may thus enable the level displacement of the container 2 with respect to the dock 500 as mentioned above, with at least one of the associated advantages.

Figure 4A:
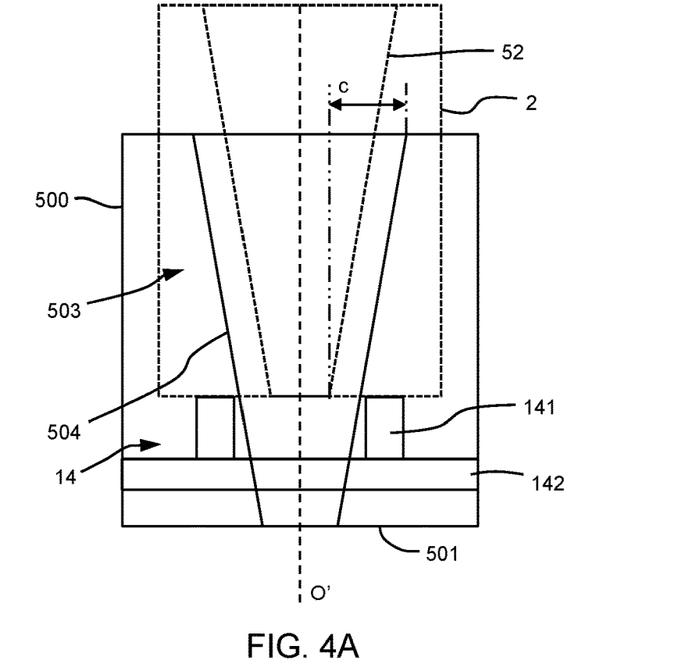
FIGS. 4A and 4B illustrate a tapered geometry of an asymmetric engaging mechanism of the dock.
Figure 4B:
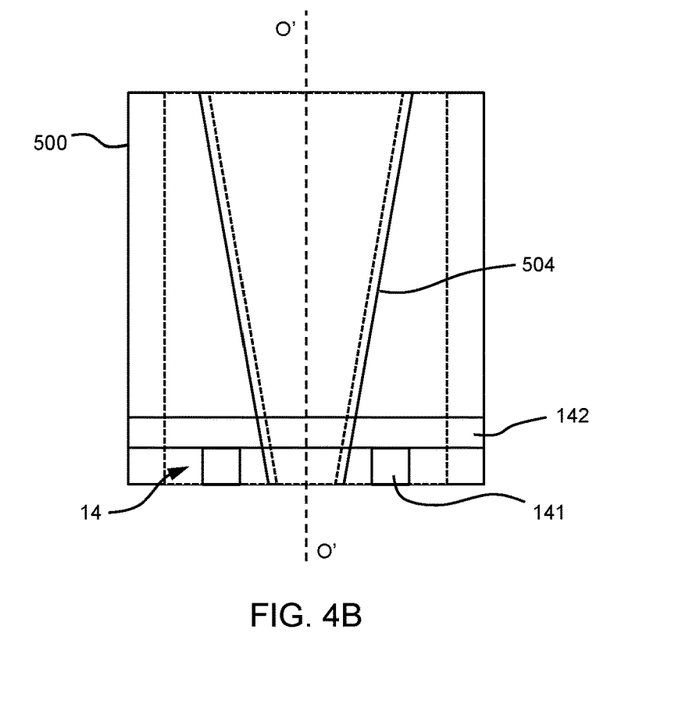

Additionally or alternatively, as illustrated in FIG. 4A and FIG. 4B, the actuator 45 may comprise at least two levers 14 provided on opposing parts of the actuator 45, for example with respect to a mid-plane (O'-O'), perpendicular to the plane (O-O) of FIG. 2A and FIG. 2B. The at least two levers 14 may be operated simultaneously, for example with respect to the mid-plane (O'-O') as shown in FIG. 4A and FIG. 4B. For example the at least two levers 14 may comprise two arms 141 provided on the same rotating shaft 142. The at least two levers 14 may be configured to cooperate with two corresponding lever engaging surfaces 442 of the fluid container 2. The symmetrical location of the two levers 14 with respect to the plane (O'-O') may thus enable the level displacement of the container 2 with respect to the dock 500 as mentioned above, with at least one of the associated advantages.

Therefore, in a non-limiting example, the actuator 45 may comprise fours levers 14, that is two levers 14 provided on opposing parts of the actuator 45 with respect to the plane (O-O) of FIG. 2A and FIG. 2B, and two levers 14 provided on opposing parts of the actuator 45 with respect to the plane (O'-O') of FIG. 4A and FIG. 4B. The symmetrical location of the four levers 14 with respect to the planes (O-O) and (O'-O') may thus enable the level displacement of the container 2 with respect to the dock 500 as mentioned above, with at least one of the associated advantages.

Additionally or alternatively, as illustrated in FIGS. 2A, 2B, 3A, 3B and 3C, in some examples, the fastening and/or guiding mechanism 44 of the dock 500 may further comprise a receiver 502 for accommodating the fluid container 2 in the disengaged condition (FIG. 2A and FIG. 4A) and in the engaged condition (FIG. 2B and FIG. 4B). In some examples, the receiver 502 may comprise at least one lower wall configured to cooperate with the end 11 of the container 2 and/or at least one lateral wall configured to cooperate with the lateral walls of the container 2. The receiver 502 may act as a guide for the container 2 and may thus enable the level displacement of the container 2 with respect to the dock 500 as mentioned above, with at least one of the associated advantages.

Additionally or alternatively, the receiver 502 may comprise an asymmetric engaging mechanism 503 configured to cooperate with a complementary asymmetric engaging mechanism 52 of the fluid container 2, such that the fluid container may be accommodated in only one spatial orientation with respect to the dock 500.

The dock 500 may thus prevent the container 2 to be inserted in the dock 500 in an incorrect orientation with respect to the dock 500. The dock 500 may thus prevent the incorrect coupling of the container 2 to the fluid circulation system 1 of the engine 50.

Figure 3A:
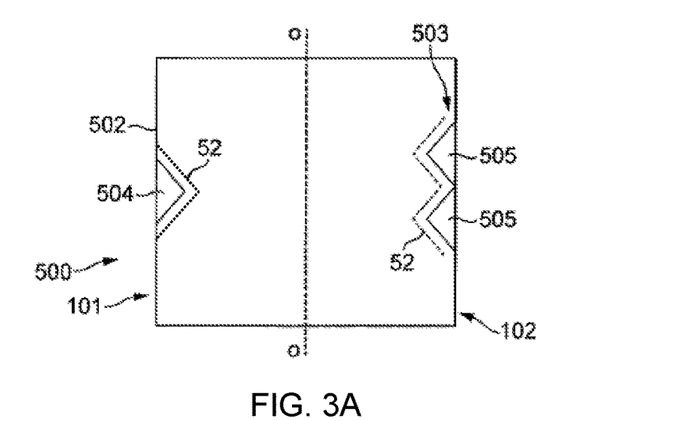
FIGS. 3A, 3B and 3C show schematic illustrations of an asymmetric engaging mechanism of the dock.

As illustrated in FIG. 3A, the asymmetric engaging mechanism 503 may comprise a first number (for example one (1)) of patterns 504 provided in one part 101 of the receiver 502 and a second, different, number (for example two (2)) of patterns 505 provided in another part 102 of the receiver.

Figure 3B:
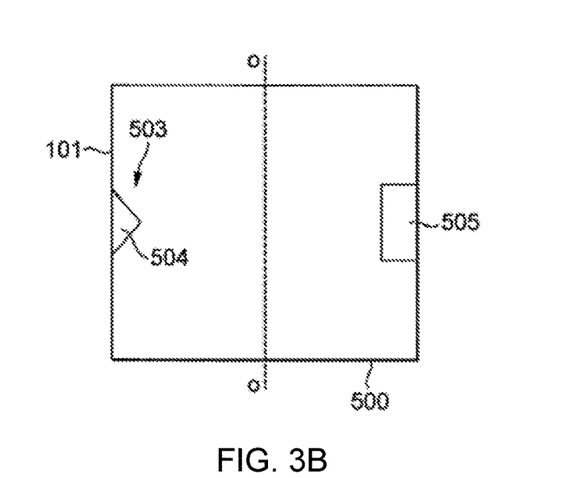

Alternatively or additionally, as illustrated in FIG. 3B, the asymmetric engaging mechanism 503 may comprise at least one pattern 504 with a first shape (for example a triangle) provided in one part 101 of the receiver 502 and at least one pattern 505 with a second, different, shape (for example a rectangle) provided in another part 102 of the receiver 502.

Figure 3C:
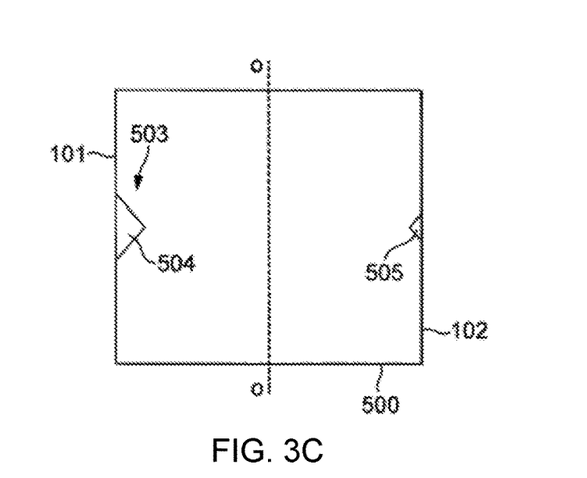

Alternatively or additionally, as illustrated in FIG. 3C, the asymmetric engaging mechanism 503 may comprise at least one pattern 504 with a first dimension provided in one part of the receiver 502 and at least one pattern 505 with a second, different, dimension provided in another part 102 of the receiver 502.

In some examples, the parts 101 and 102 may be opposing each other with respect to the plane (O-O) or the plane (O'-O').

As illustrated in FIG. 4A and FIG. 4B, in some examples the asymmetric engaging mechanism 503 may be tapered towards the docking interface 501 of the dock 500. The tapered geometry may enable the asymmetric engaging mechanism 503 to be configured to provide clearance c between the asymmetric engaging mechanism 503 of the dock 500 and the complementary asymmetric engaging mechanism 52 of the fluid container 2 for enabling a user and/or operator to easily engage the complementary asymmetric engaging mechanism 52 of the fluid container 2 with the asymmetric engaging mechanism 503 of the dock 500. This may enable easy and convenient insertion of the container 2 in the dock 500. The tapered geometry may enable the asymmetric engaging mechanism 503 to guide the fluid container 2 from the disengaged condition into the engaged condition into the docking interface 501 in a well-defined and tight manner in the docking interface 501.

In some examples, the actuator 45 may further comprise at least one handle 17 coupled to the lever 14. As illustrated in FIG. 2A and FIG. 2B, the handle 17 may be configured to be operated by a user to cause the actuator 45 to be operated from the first condition (FIG. 2A) to the second condition (FIG. 2B).

Alternatively or additionally, the handle 17 may further be configured to be operated by a user to cause the actuator 45 to be operated from the second condition (FIG. 2B) to the first condition (FIG. 2A).

The handle 17 may be located at a proximal end of the actuator 45. The location of the handle 17 at the proximal end of the actuator 45 may enable convenient operation of the handle 17 by a user and/or operator.

As illustrated in FIG. 2B, the handle may further be configured to cover at least partly the part 11 of the fluid container 2 when the container 2 is in the engaged condition. The covering of the part 11 of the fluid container 2 may prevent accidental and/or unintentional extraction of the container from the dock 500 in the engaged condition.

In the examples of FIG. 2A and FIG. 2B, the handle 17 may be coupled to the lever 14 via an elongate actuator member 12 of the actuator 45.

As schematically illustrated in FIG. 2A, in the first condition, the actuator 45 may be configured to abut with the complementary fastening mechanism 442 located at the part 10 of the fluid container 2 arranged to be docked to the docking interface 501 of the dock 500 in the engaged condition, that is the distal end 10 of the container 2 and the distal end of the actuator.

The location of the complementary fastening mechanism 442 and the lever 14 at the part 10 may enable minimise tolerance stack between the container 2 and the dock 500, and thus may enhance tight cooperation of the container 2 and the docking interface 501 of the dock 500.

In some examples, in the disengaged condition, the fastening mechanism 44 may be further configured to hold the fluid container 2 such that the fluid port 456 of the container 2 is spaced from the docking interface 501 of the dock 500, for example by a distance d. The fastening mechanism 44 may thus prevent the fluid port 456 of the container 2 and/or a port 81 of the system 1 locating on the dock 500 to be damaged by a shock between the container 2 and the dock 500 if the container 2 is dropped, for example accidentally, in the dock 500.

The dock 500 may comprise a guiding mechanism 44 configured to guide the fluid container 2 toward the position seated (for example FIG. 1A and FIG. 2A) within the dock 500 to enable the fluid container 2 to be docked to the docking interface 501 of the dock 500 in the engaged condition.

As already mentioned, alternatively or additionally, the dock 500 comprises the guiding mechanism 44 configured to control engagement of the fluid container 2 into the dock 500 from the disengaged condition to the engaged condition and/or from the engaged condition to the disengaged condition.

In embodiments, the fastening mechanism and the guiding mechanism may be at least partly combined in the actuator 45 and/or the receiver 502.

The dock 500 may be provided on a vehicle 100 or on a carrier. One or more docks 500 may be provided on the vehicle 100 or the carrier.

In the case where the dock 500 is provided on a vehicle 100, the dock 500 may further comprises at least one fluid port, such as the fluid port 81, comprising the coupling 8 adapted to connect to the corresponding coupling 7 on the fluid container 2 to connect the fluid container 2 in fluidic communication with the fluid circulation system 1 of or associated with the engine 50.

The dock 500 may be provided directly proximate to the engine 50, but may also be provided away from the engine 50, such as in the boot of the vehicle 100.

The dock 500 may further comprise an interface 21 for data communication with the data provider 20 of the fluid container 2.

In the case where the dock 500 is provided on a carrier, such as a pallet, for recycling and/or analysing and/or servicing of the container 2, the dock 500 does not need to comprise a fluid port, but in some examples the dock may also comprise a fluid port, for example for emptying the container 2, for example before recycling of the container and/or fluid 3. In some examples the carrier may be any carrier located on any transportation device; in a vehicle service centre; in an analysing facility; and/or in a recycling facility.

Figure 5:
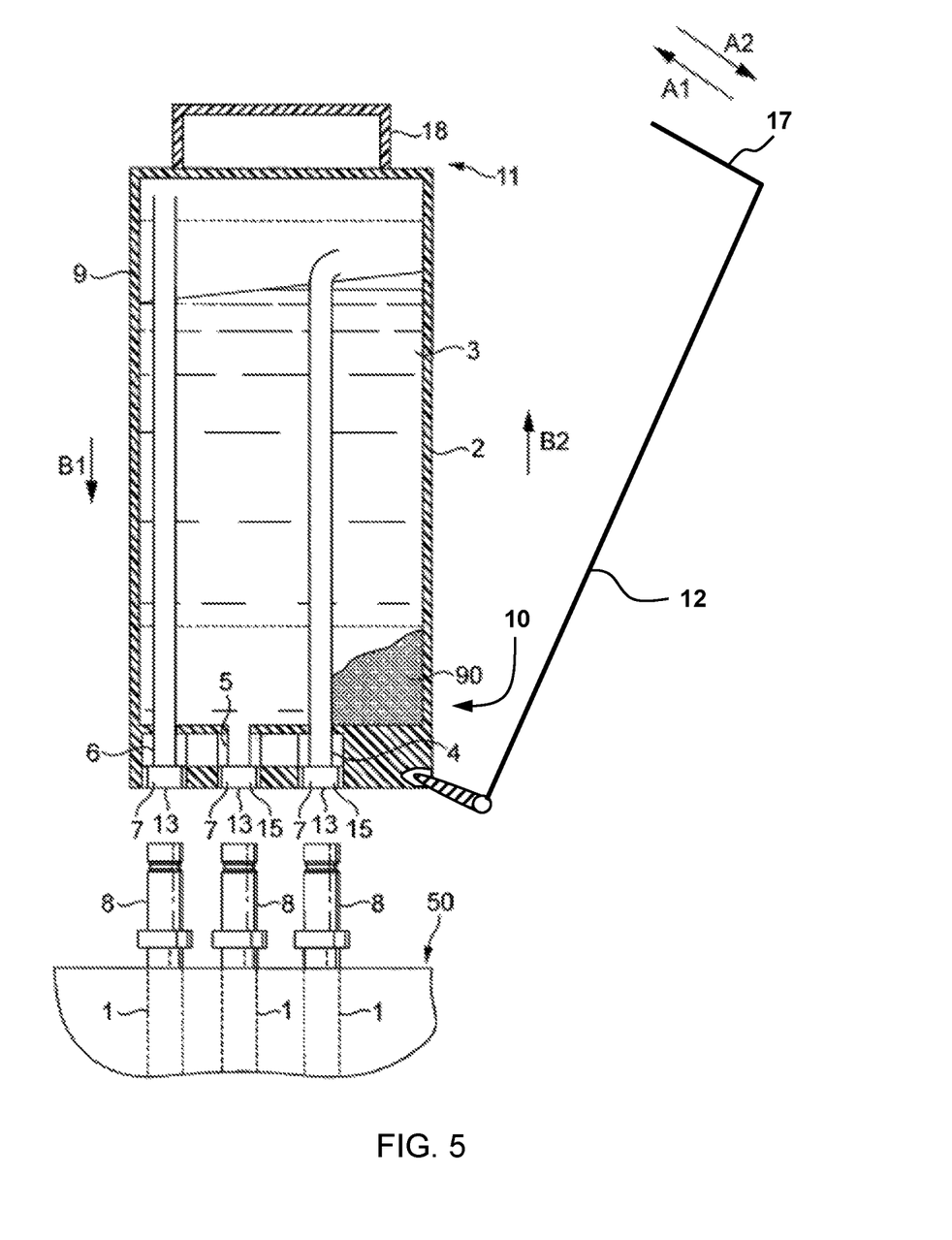
FIG. 5 represents in schematic part cross-section, a dock with a container disconnected from couplings on a vehicle engine.

As illustrated in FIG. 5 the fluid container 2 may comprise a filter 90. The container 2 illustrated in FIG. 5 comprises, at the first end 10, at least one fluid outlet port 5, at least one fluid inlet port 4 and at least one vent port 6 in which, each of said ports 4, 5 or 6 comprises couplings 7, for example self-sealing, adapted to connect to corresponding couplings 8 on the dock 500 to thereby connect said container 2 in fluidic communication with the engine fluid circulation system 1.

Each of said couplings 7 comprises a latch 13 which is biased to a docked position to thereby retain said container 2 in fluidic communication with said vehicle engine fluid circulation system 1.

In some examples, each of said couplings 7 may be remotely operable to disconnect said container 2 from the dock 500, and thus from said vehicle engine circulation system 1. To that effect, the actuator 45 may be configured to cooperate with the complementary fastening mechanism 442 of the fluid container 2. For examples, the lever 14 of the actuator 45 may cooperate with the groove 442 of the container 2. As explained in greater detail below, movement of the actuator 45 causes operation of the latches 13. The actuator 45 comprises the elongate actuator member 12 extending between the first end 10 and the second end 11 of the container 2. Each latch 13 comprises a collar 15 associated with each of said latches 13.

The lever 14 is operable by the handle 17 located at an end of the elongate actuator member 12 distal from the ports 4, 5, and 6.

Movement of the elongate actuator member 12 of the actuator 45 by pulling on the handle 17 in the direction shown generally as A1, causes the elongate actuator member 12 and the lever 14 of the actuator 45 to act, via the groove 442 of the container 12, on each of the latch collars 15, thereby to operate each of said latches 13, and connect the container 2 to the engine fluid circulation system 1. The container 2 may then be connected to the dock 500 in the direction shown generally as B1.

Alternatively, the handle 17 may be pivotally or slideably mounted with respect to the dock 500 as a lever for operating the actuator 45.

On the contrary, movement of the elongate actuator member 12 of the actuator 45 by pulling on the handle 17 in the direction shown generally as A2, causes the elongate actuator member 12 and the lever 14 of the actuator 45 to act on each of the latch collars 15, via the groove 442 of the container 12, thereby to operate each of said latches 13, and disconnect the container 2 from the engine fluid circulation system 1. The container 2 may then be removed away from the engine 50 in the direction shown generally as B2. The container 2 may comprise a handle 18 such that a user may hold the container 2. After the disconnected container 2 has been removed from the engine 50 and vehicle 100, another container 2 which may contain fresh, refreshed or unused fluid 3 may be reconnected to the couplings 8. Thus, pressing the replacement container 2 in the opposite direction B1 to the direction B2 of disconnection causes the self-sealing couplings 7 to engage and retain the container 2 on the engine 50.

In use, the container 2 is retained in fluidic communication with the vehicle engine fluid recirculation system 1 by the self-sealing couplings 8.

Figure 6:
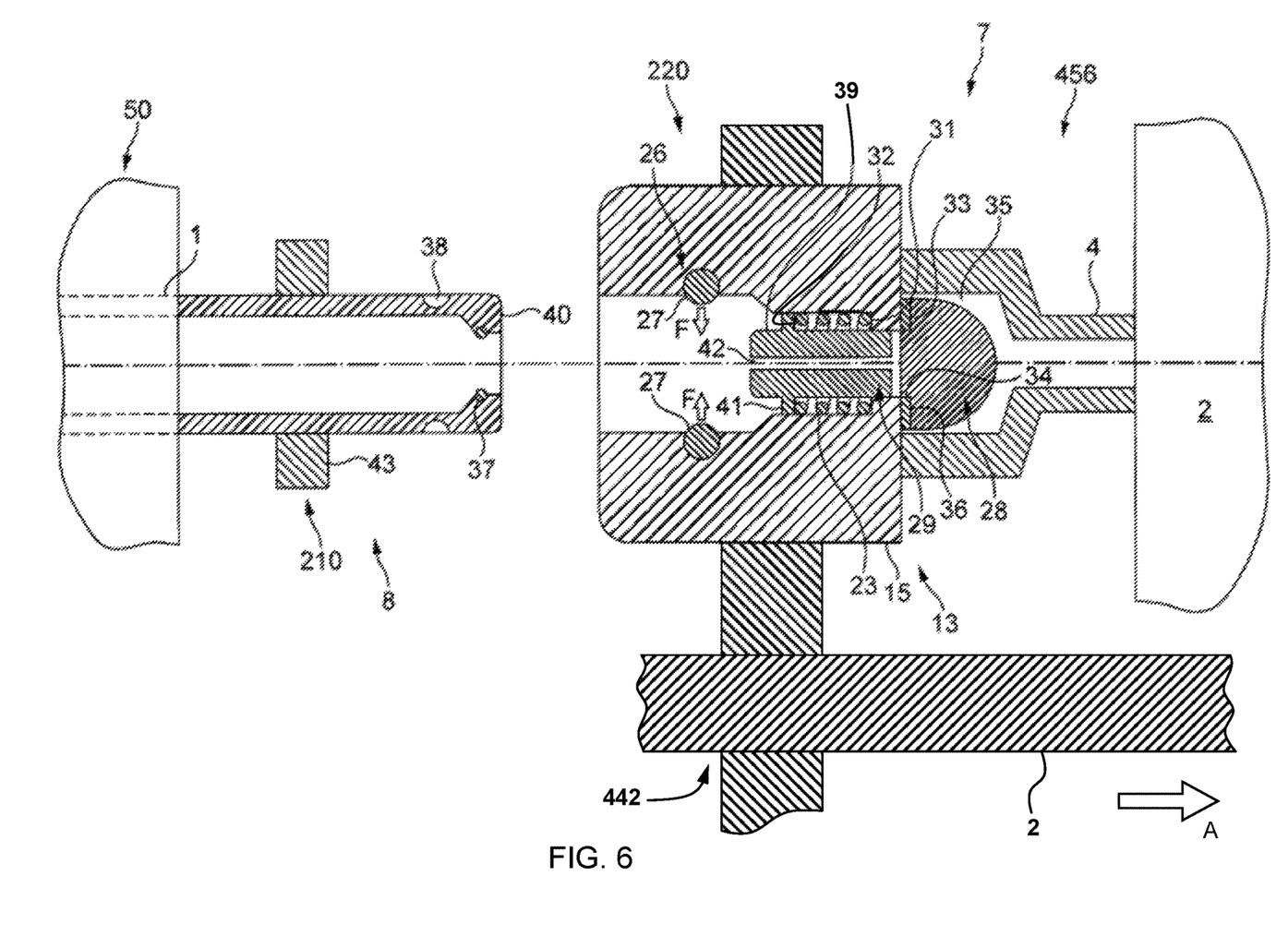
FIG. 6 represents in schematic cross-section, a self-sealing coupling comprising a latch.

FIG. 6 shows in schematic longitudinal cross-section of non-limiting examples of a self-sealing coupling 8 and a self-sealing coupling 7 comprising a latch 13 suitable for use in a dock 500 of the present disclosure.

The coupling comprises a male element 210 and a female element 220. The female element 220 may be part of a port 456, for example an inlet port 4 (as shown) or alternatively an outlet port (not shown) or a vent port (not shown) on the container 2. The coupling comprises the remotely operable latch 13 comprising the collar 15.

The collar 13 has a surface 26 which exerts a radial force in the direction F on balls 27. In some examples, the coupling 7 may comprises a self-sealing valve 28 which is biased to a closed position when the male and female elements 210 and 220 are disconnected, as shown in FIG. 6. The valve 28 comprises an axially moveable element 29 which is biased to a closed position by the action of a spring 23 acting against a face 31 on the port 4 and a face 32 on the axially moveable element 29. When in the closed position, a valve face 33 of the axially moveable element 29 bears against a valve seat 34 of the port 4 to seal a passage 35 to prevent fluid flow through the valve 28. One or either or both of the valve face and valve seat may comprise a seal 36.

The male element 210 is in fluidic communication with the vehicle engine fluid circulation system 1 of the engine 50 and comprises a sealing element 37, for example an O-ring. The male element 210 comprises an indent 38 which may be in the form of an external groove for receiving the balls 27 when engaged with the female member 220.

As the male element 210 is inserted into the female element, the sealing element 37 engages a circumferential face 39 of the axially moveable valve element 29. This sealably engages the male and female elements 210 and 220 before the valve allows any fluid to flow.

As the male element 210 is inserted further into the female element 220, an end 40 of the male element 210 engages a flange 41 (suitably circumferential) on the axially moveable valve element 29 and further insertion of the male element 210 causes the male element acting through the male element end 40 and the flange 41 to displace the axially moveable valve element 29 against the action of the biasing spring 23 and displace the valve face 33 from the valve seat 34 allowing fluid to flow through the passage 35 and through a duct 42 in the axially moveable valve element 29.

Thus, the self-sealing valve has the characteristic that when the coupling is being connected, a seal is made between the connecting ports before any valves open to allow fluid to flow.

As the male element 210 is inserted still further into the female element 220, the male member acts upon the balls 27 in the opposite direction to F until it is sufficiently positioned inside the female element 220 for the balls 27 to engage the indent 38. This latches the male and female members 210 and 220 together and retains the container 2 in fluidic communication with the vehicle engine fluid recirculation systems 1 of the engine 50. Positioning of the male and female members may be assisted by a flange 43 on the male member 210.

In use to disconnect the male and female members 210 and 220, the actuator member 12 is operated in the direction A2 as illustrated in FIG. 5 and, through the lever 14, axially displaces the collar 15 of the latch 13 away from the male member 210. The axial movement of the collar 15 causes the balls 27 to move out of the indent 38 of the male member 210 and thereby unlatch the male member 210. The container 2 may now be removed and disconnected from the vehicle engine fluid recirculation system 1. Thus, displacement of the female element 220 in the direction B2 disengages the balls 27 from the recess 38. Further displacement of the female element 220 in the direction B2 allows the axially moveable valve member 29 under the action of the spring 23 to be displaced and urge the valve face 33 against the face seat 34 thereby preventing flow of fluid through the passage 35 and duct 42. This seals the valve 28 before the male and female elements 210 and 220 are disconnected and, in particular, before the seal 37 of the male member 210 disengages the circumferential surface 39 of the axially moveable valve member 29.

The container may then be removed from the vehicle (not shown).

As already mentioned, the container 2 may comprise a data provider 20, and in some non-limiting examples, the data provider 20 may be configured to provide data about the fluid container 2. In examples the data provider 20 may be coupleable to provide the data to the control device 21, such as an engine control device, via a communication link 97. The data provider 20 may be positioned on the container 2 so that, when the container 2 is coupled in fluidic communication with the circulation system 1 of the engine 50, the data provider 20 is also arranged to communicate the data with the control device 21, and if the container 2 is not positioned for fluidic communication with the circulation system 1, communication with the data provider 20 is inhibited.

In some examples, the data, for example data obtained from the control device 21, may further be provided to a memory. In some examples, the memory may be distributed in memories selected from a list comprising: a memory 94 of a management device (for example comprising the control device 21), a memory 104 of the data provider 20 of the container 2, and/or a memory of the dock 500 for the container 2.

The control device 21, for example the engine control device, comprises a processor 96, and the memory 94 configured to store data.

In examples, the processor 96 may be configured to monitor and/or to control the operation of the engine, via communication links.

The control device 21 may be further configured to obtain a signal indicating that the container 2 is coupled to the circulation system 1 of the engine 50 and/or data from the data provider 20 via the communication link 97.

The data provider 20 of the container 2 may comprise a processor 103 arranged to receive signals from a fluid sensor 93 and/or a latch sensor 30. The processor 103 may be arranged to communicate the signal indicating that the container 2 is coupled to the dock 500, and thus the circulation system 1, and/or the data to the control device 21 via the communication link 97. The data provider 20 may further comprise a memory 104 for storing data describing the fluid 3. In particular, the memory 104 may store data including at least one of: the grade of the fluid, the type of fluid, the date on which the fluid was filled or replaced, a unique identifier of the container 2, an indication of whether the container 2 is new, or has previously been refilled or replaced, an indication of the vehicle mileage, the number of times the container 2 has been refilled or reused, and the total mileage for which the container has been used.

The engine 50 may comprise an engine communication interface 106 arranged to communicate operational parameters of the engine 50, such as engine speed and throttle position, to the processor 96 of the control device 21 via a communication link 98. The engine communication interface 106 may further be operable to receive engine command from the control device 21 and to modify operation of the engine 50 based on the received commands.

The memory 94 of the control device 21 comprises non-volatile memory configured to store:
identifiers of acceptable fluids for use in the engine 50;
data defining a first container fluid level threshold and a second fluid level threshold;
data indicative of an expected container fluid level based on the mileage of the vehicle;
data defining a service interval, wherein the service interval is the time period between performing maintenance operations for the vehicle such as replacing the fluid;
the vehicle mileage;
sets of engine configuration data for configuring the engine to operate in a selected way;
an association (such as a look up table) associating fluid identifiers with the sets of engine configuration data; and
data indicative of an expected fluid quality based on the mileage of the vehicle.

The processor 96 is operable to compare data stored in the memory 94 with data obtained from the data provider 21 of the container 2 and/or from the communication interface 106 of the engine 50.

The processor 103 of the container 2 may be configured to obtain data indicating the expected fluid level based on the mileage since the fluid was last refilled, and to compare the fluid level sensed by the sensor 93 with stored data. In the event that this comparison indicates that the fluid level is changing more quickly than expected, the data provider 20 can be configured to send data to the control device 21 to modify a service interval for the vehicle based on this comparison.

Many different types and grades of fluids 3 are available and the data provider 20 may comprise an identifier of the fluid 3.

The data provider 20 may comprise a computer readable identifier for identifying the fluid 3. The identifier may be an electronic identifier, such as a near field RF communicator, for example a passive or active RFID tag, or an NFC communicator.

The data provider 20 may be configured for one way communication. For example the data provider 20 may be configured only to receive data from the control device 21, so that the data can be provided to the memory 104 at the container 2. For example the memory 104 may be configured to receive data from the engine control device 21. This enables data to be stored at the container 2. Such stored data can then be provided from the memory 104 to diagnostic devices during servicing and/or during replacement of the container 2. Alternatively the data provider 20 may be configured only to provide data to the control device 21. In some possibilities, the data provider 20 is adapted to provide data to and receive data from the control device 21.

Figure 7:
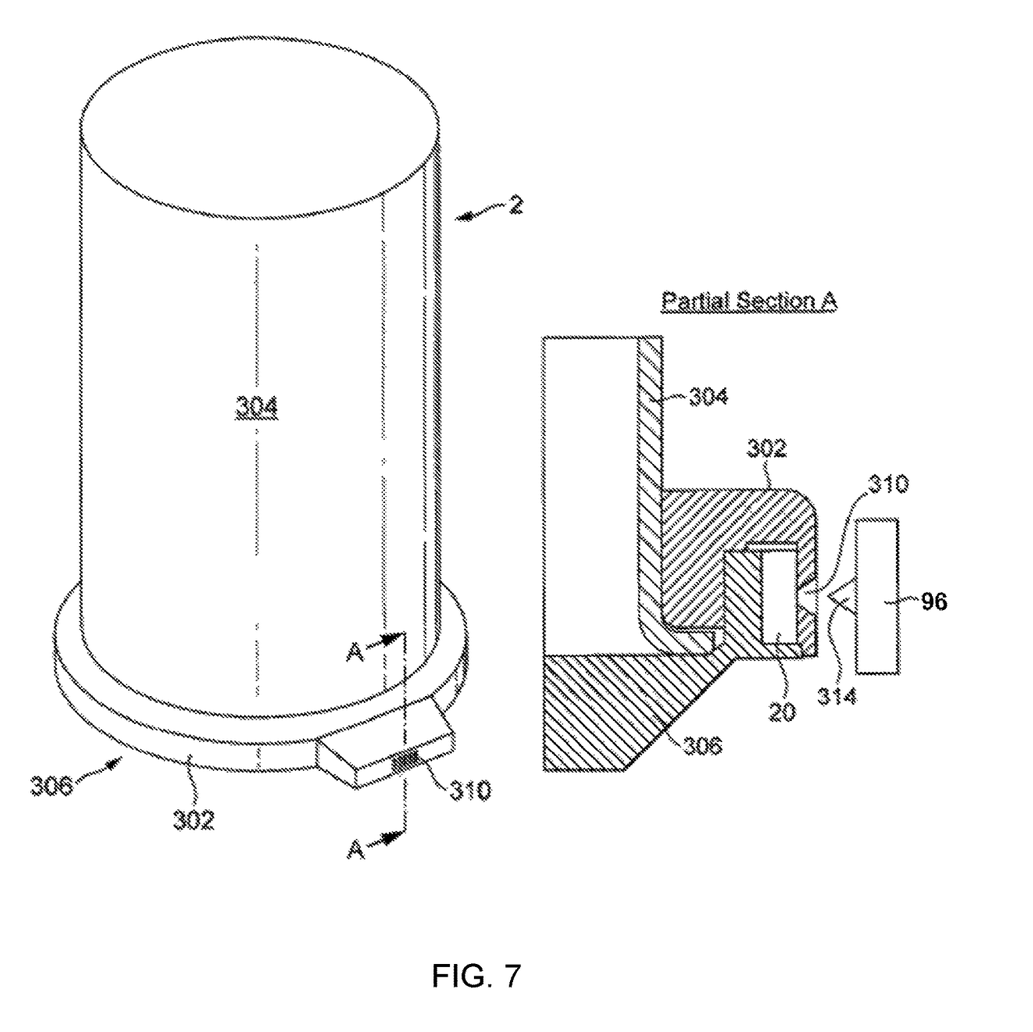
FIG. 7 shows in schematic elevation view, a replaceable fluid container for an engine and a partial section through a wall of the container.

FIG. 7 shows an elevation view of a container 2 and a partial section through a wall of the container 2. The container 2 comprises a body 304, and a base 306. The body 304 is secured to the base by a lip 302. The data provider 20 may be carried in the lip 302.

The lip 302 may include a data coupling 310 to enable the data provider 20 to be coupled to the interface 96 for communicating data with the control device (not shown in FIG. 7). The interface 96 may comprise connectors 314 for connecting the interface 96 with the data provider 20 of the container 2.

The base 306 of the container 2 comprises a fluid coupling (not shown in FIG. 7) for coupling fluid from the reservoir 9 of the container 2 with the circulation system 1 of the engine 50. The fluid coupling and the data coupling 310 are arranged so that connecting the fluid coupling in fluidic communication with the circulation system 1 of the engine 50 also couples the data provider 20 for data communication with the control device 21 via the interface 96 by seating the connectors 314 of the interface 96 in the data coupling 310 on the container 2.

In some examples, the interface 96 and the connectors 314 may provide electrical connections for up to eight (8) channels which provide measurements for fluid temperature, fluid pressure, fluid quality, fluid type, and the level (e.g. amount) of fluid in the container 2. The connectors 314 may be arranged to provide electrical power to the data provider 20.

The fastening and/or guiding mechanism 44 may prevent the engine 50 from operating if the container 2 is disconnected from the engine fluid circulation system 1 and/or to prevent the container 2 being disconnected from the engine 50 if the engine is operating. At least one of the ports 4, 5 or 6 may comprise a non-return valve. Suitably, the at least one outlet port 5 comprises a non-return valve. If the container comprises more than one outlet port, suitably each outlet port comprises a non-return valve. The non-return valve in the outlet may prevent fluid from draining back to the container 2 when the engine 50 is not operating and may help keep a fluid line to a circulating pump full of fluid so that circulation of fluid is immediate when operation of the engine is started.

The fluid inlet port or ports 4 may each comprise a control valve or shut-off valve which may be closed when the vehicle engine is not operating, for example to prevent or reduce fluid draining from the container 2 to the engine 50.

The vent port or vent ports 6 may not contain any valves because fluid, for example gas and/or vapour, may be required to flow both to and from the container through the vent port or vent ports 6 when the container is connected to the vehicle engine fluid circulation system 1.

As mentioned, the container 2 may comprise a filter 90 for filtering the fluid 3. This is suitable when the fluid is an engine lubricating oil composition. Suitable filters 90 may comprise paper and/or metal filter elements. The filter 90 may be suitable for filtering particles in the range 1 to 100 microns, suitably in the range 2 to 50 microns, for example in the range 3 to 20 microns. The filter 90 may comprise a filter by-pass for fluid to bypass the filter, for example if the filter 90 becomes blocked or unacceptably loaded with material, which may cause an unacceptable fluid back-pressure through the filter 90. An advantage of having a filter 90 in the container 2 is that this may allow a larger filter to be used than if the filter were in a separate container associated with the engine fluid circulation system 1. This may have one or more of the following benefits: (a) increased filtration efficiency; (b) finer filtration and (c) increased filter lifetime. Suitably, in use, fluid enters the container 2 through the inlet port 4 and is passed to the top of the container 2, for example through at least one conduit in the container 2; some or all of the fluid 3 is passed through the filter 90 on exiting said conduit; and the totally or partially filtered fluid is withdrawn from the base of the container through the outlet port 5. The filter 90 may operate at elevate pressure.

The container 2 may be manufactured from metal and/or plastics material. Suitable materials include reinforced thermoplastics material which for example, may be suitable for operation at temperatures of up to 150° C. for extended periods of time.

The container 2 may comprise at least one trade mark, logo, product information, advertising information, other distinguishing feature or combination thereof. The container 2 may be printed and/or labelled with at least one trade mark, logo, product information, advertising information, other distinguishing feature or combination thereof. This may have an advantage of deterring counterfeiting. The container 2 may be of a single colour or multi-coloured. The trademark, logo or other distinguishing feature may of the same colour and/or material as the rest of the container or a different colour and/or material as the rest of the container.

The container 2 may be a container 2 for a fluid which is a liquid. As already mentioned, suitable liquids include engine lubricating oil composition and heat exchange fluid for an electric engine.

The container 2 may be a container for engine lubricating oil composition. Thus, the container may contain engine lubricating oil composition. In this embodiment, the container 2 may be provided as a self-contained container containing fresh, refreshed or unused lubricating oil composition which may conveniently replace a container on an engine 50 containing used or spent lubricating oil composition. If the container 2 also comprises the filter 90, this also is replaced together with the spent or used lubricating oil composition. Thus, a fluid reservoir container 2 containing spent or used lubricating oil composition retained in fluidic communication with the vehicle engine fluid circulation system 1 may be disconnected from the vehicle engine fluid circulation system, removed from the vehicle and replaced by a container containing fresh, refreshed or unused lubricating oil composition and if present a fresh, renewed or new filter.

The engine lubricating oil composition may comprise of at least one base stock and at least one engine lubricating oil additive. Suitable base stocks include bio-derived base stocks, mineral oil derived base stocks, synthetic base stocks and semi synthetic base stocks. Suitable engine lubricating oil additives are known in the art. The additives may be organic and/or inorganic compounds. Typically, the engine lubricating oil composition may comprise about 60 to 90% by weight in total of base stocks and about 40 to 10% by weight additives. The engine lubricating oil composition may be a lubricating oil composition for an internal combustion engine. The engine lubricating oil composition may be a mono-viscosity grade or a multi-viscosity grade engine lubricating oil composition. The engine lubricating oil composition may be a single purpose lubricating oil composition or a multi-purpose lubricating oil composition.

The engine lubricating oil composition may be a lubricating oil composition for an internal combustion engine. The engine lubricating oil composition may be a lubricating oil composition for a spark ignition internal combustion engine. The engine lubricating oil composition may be a lubricating oil composition for a compression internal combustion engine.

The container may be a container for heat exchange fluid for an electric engine. Thus, the container may contain heat exchange fluid for an electric engine. In this embodiment, the container may be provided as a self-contained container containing fresh, refreshed or unused heat exchange fluid for an electric engine which may conveniently replace a container on an engine containing used or spent heat exchange fluid. If the container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The fluid reservoir container may provide a heat storage container in which heat exchange fluid may be stored for use to heat the electric engine when required. The fluid reservoir container may provide a container for storage of coolant at a temperature below the operating temperature of the engine for use to cool the electric engine when required.

Suitable heat exchange fluids for electric engines may be aqueous or non-aqueous fluids. Suitable heat exchange fluids for electric engines may comprise organic and/or non-organic performance boosting additives. Suitable heat exchange fluids may be man-made or bio-derived, for example Betaine. The heat exchange fluids may have fire retarding characteristics and/or hydraulic characteristics. Suitable heat exchange fluids include phase change fluids. Suitable heat exchange fluids include molten metals or salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

The engine 50 may be any type of engine for example for a vehicle and/or may also be a reverse engine, such as a generator, such as a wind turbine generator.

The container may be suitable for operating at temperatures of from ambient temperature up to 200° C., suitably from −20° C. to 180° C., for example from −10° C. to 150° C.

The container may be suitable for operating at gauge pressures up to 15 bar (unit of gauge pressure, $1\ Pa=10^{-5}$ bar), suitably from −0.5 bar to 10 bar, for example from 0 bar to 8 bar.

Suitable vehicles include motorcycles, earthmoving vehicles, mining vehicles, heavy duty vehicles and passenger cars.

The fluid reservoir container is advantageous where rapid replacement of the fluid is required or advantageous, for example in "off-road" and/or "in field" services.

Although the example shown in FIG. 7 comprises conductive electrical connections 314 for communicating with the data provider 20, a contactless connection may also be used. For example, inductive or capacitive coupling can be used to provide contactless communication. One example of inductive coupling is provided by RFID, however other near field communications technology may also be used. Such couplings may enable electrical power to be transferred to the data provider 20, and also have the advantage that the data connection does not require any complex mechanical arrangement and the presence of dirt or grease on the couplings 310, 314 is less likely to inhibit communication with the data provider 20.

The container 2 may comprise a power provider such as a battery for providing electrical power to the data provider 20. This may enable the container 2 to be provided with a range of sensors, including sensors for fluid temperature, pressure and electrical conductivity. Where the container 2 comprises a filter sensors may be arranged to sense these parameters of the fluid as the fluid flows into the filter, and after the fluid has flowed through the filter.

The function of the processors 103, 96 may be provided by any appropriate controller, for example by analogue and/or digital logic, field programmable gate arrays, FPGA, application specific integrated circuits, ASIC, a digital signal processor, DSP, or by software loaded into a programmable general purpose processor.

Aspects of the disclosure provide computer program products, and tangible non-transitory media storing instructions to program a processor to perform any one or more of the methods described herein.

The memory 104 is optional. The computer readable identifier may be an optical identifier, such as a barcode, for example a two-dimensional barcode, or a colour coded marker, or optical identifier on the container 2. The computer readable identifier may be provided by a shape or configuration of the container 2. Regardless of how it is provided, the identifier may be encrypted.

The communication links 97 and/or 98 may be any wired or wireless communication link, and may comprise an optical link.

Although circulated engine fluid is described as being returned to the fluid container 2 for recirculation, in the context of the present disclosure, those skilled in the art will appreciate that circulated engine fluid could be expelled (as it is the case for de-icer) and/or collected and/or stored in a container coupled to the engine 50 and, when convenient, emptied from or otherwise removed, e.g., from the vehicle 100.

Other variations and modifications of the apparatus will be apparent to persons of skill in the art in the context of the present disclosure.

The invention claimed is:

1. A dock for a replaceable fluid container for an engine, wherein the fluid container includes a fluid reservoir, and a fluid port including a coupling adapted to couple with a fluid circulation system associated with the engine, the dock comprising:
   a fastening mechanism configured to cooperate with the fluid container such that, as the fluid container is inserted into the dock, the fastening mechanism acts first to seat the fluid container in the dock in an undocked condition and then, as the fluid container is inserted further into the dock, the fastening mechanism acts to bring the fluid container into an engaged condition in which the fluid container is docked with a docking interface of the dock;
   wherein the fastening mechanism comprises an actuator configured to cooperate with a complementary fastening mechanism of the fluid container, the actuator being configured to be operated between:
   a first condition where the actuator abuts with the complementary fastening mechanism of the fluid container to hold the fluid container such that the fluid port of the fluid container is in the undocked condition from the docking interface of the dock;
   a second condition where the actuator is fastened to the complementary fastening mechanism of the fluid container; and
   a guiding mechanism configured to guide the fluid container toward a position seated within the dock to enable the fluid container to be docked to the docking interface of the dock in the engaged condition.

2. The dock of claim 1, wherein:
   the actuator comprises a lever; and
   the complementary fastening mechanism comprises a lever engaging surface configured to cooperate with the lever.

3. The dock of claim 1, wherein the actuator is configured to be movable with respect to the docking interface in order to guide the fluid container from the undocked condition into the engaged condition.

4. The dock of claim 1, wherein the actuator is configured to be movable with respect to the docking interface in order to guide the fluid container from the engaged condition to the undocked condition.

5. The dock of claim 1, wherein the actuator is configured to guide the fluid container from the undocked condition to the engaged condition in a direction normal to the docking interface of the dock.

6. The dock of claim 1, wherein the actuator is configured to guide the fluid container from the engaged condition to the undocked condition in a direction normal to the docking interface of the dock.

7. The dock of claim 1, wherein the actuator comprises:
a handle coupled to the lever and configured to be operated by a user to cause the actuator to be operated from the first condition to the second condition.

8. The dock of claim 7, wherein the handle is further configured to cover at least partly a part of the fluid container when the fluid container is in the engaged condition.

9. The dock of claim 1, wherein the actuator comprises:
a handle coupled to the lever and configured to be operated by a user to cause the actuator to be operated from the second condition to the first condition.

10. The dock of claim 1, wherein, in the first condition, the actuator abuts with the complementary fastening mechanism located at a part of the fluid container arranged to be docked to the docking interface of the dock in the engaged condition.

11. The dock of claim 1, further comprising:
a receiver for accommodating the fluid container in the undocked condition and in the engaged condition.

12. The dock of claim 11, wherein the receiver comprises: an asymmetric engaging mechanism configured to cooperate with a complementary asymmetric engaging mechanism of the fluid container, such that the fluid container may be accommodated in only one spatial orientation with respect to the dock.

13. The dock of claim 12, wherein the asymmetric engaging mechanism comprises:
a first number of patterns provided in one part of the receiver; and
a second, different, number of patterns provided in another part of the receiver.

14. The dock of claim 12, wherein the asymmetric engaging mechanism comprises:
at least one pattern with a first shape provided in one part of the receiver; and
at least one pattern with a second, different, shape provided in another part of the receiver.

15. The dock of claim 12, wherein the asymmetric engaging mechanism comprises:
at least one pattern with a first dimension provided in one part of the receiver; and
at least one pattern with a second, different, dimension provided in another part of the receiver.

16. The dock of claim 12, wherein the asymmetric engaging mechanism is tapered towards the docking interface of the dock, such that the asymmetric engaging mechanism is configured to:
provide clearance between the asymmetric engaging mechanism of the dock and the complementary asymmetric engaging mechanism of the fluid container for enabling a user to engage the complementary asymmetric engaging mechanism of the fluid container with the asymmetric engaging mechanism of the dock; and to
guide the fluid container from the undocked condition into the engaged condition into the docking interface.

17. The dock of claim 1, further comprising:
at least one fluid port comprising a coupling adapted to connect to a corresponding coupling on the fluid container.

18. The dock of claim 1, further comprising:
an interface for data communication with a data provider of the fluid container.

19. The dock of claim 1, wherein, in the undocked condition, the fastening mechanism is configured to hold the fluid container such that in the undocked condition the container is spaced from the docking interface of the dock.

20. The dock of claim 1, wherein the reservoir holds a lubricant for a lubricant circulation system of the engine.

21. A replaceable fluid container configured to cooperate with a dock of claim 1, and comprising:
a fluid reservoir; and
at least one fluid port comprising a coupling adapted to couple with a fluid circulation system associated with the engine.

22. The fluid container of claim 21, further comprising:
a data provider arranged for data communication with a control device when the fluid container is engaged with the dock.

23. A dock for a replaceable fluid container for an engine, wherein the fluid container includes a fluid port including a coupling adapted to connect to a corresponding coupling on the engine to connect the fluid container in fluidic communication with a fluid circulation system associated with the engine, and a data provider arranged for data communication with a control device when the fluid container is engaged with the dock, the dock comprising: an actuator comprising two levers provided on opposing parts of the actuator and configured to cooperate with two corresponding lever engaging surfaces of the fluid container; wherein the two levers are configured to cause the fluid container to cooperate with the dock in: an undocked condition, where the two levers hold the fluid container such that the fluid port of the container is in an undocked condition from a docking interface of the dock; and an engaged condition where the data provider is arranged for data communication with the control device, where the two levers hold the fluid container in a docked condition with the docking interface of the dock; and a handle coupled to the two levers and configured to be operated by a user to cause the two levers to be operated from a first condition where the two levers abut with the two lever engaging surfaces located at a part of the fluid container arranged to be docked to the docking interface of the dock in the engaged condition of the fluid container; and a second condition where the two levers are fastened to the two lever engaging surfaces of the fluid container; and
a guiding mechanism configured to guide the fluid container toward a position seated within the dock to enable the fluid container to be docked to the docking interface of the dock in the engaged condition.

24. The dock of claim 23, further comprising a receiver for accommodating the fluid container in the undocked condition and in the engaged condition, wherein the receiver comprises:
a first number of patterns provided in one part of the receiver; and
a second, different, number of patterns provided in another part of the receiver,
wherein the patterns are configured to cooperate with complementary patterns of the fluid container, such that the fluid container may be accommodated in only one spatial orientation with respect to the dock.

25. A dock for a replaceable fluid container for an engine, wherein the fluid container includes a fluid reservoir, and a fluid port including a coupling adapted to couple with a fluid circulation system associated with the engine, the dock comprising: a guiding mechanism configured to guide the fluid container toward a position seated within the dock to enable the fluid container to be docked to a docking interface of the dock in an engaged condition; wherein the guiding mechanism comprises an actuator configured to cooperate with a complementary guiding mechanism of the fluid container, the actuator being configured to be operated between: a first condition where the actuator abuts with the complementary guiding mechanism of the fluid container to hold the fluid container such that the fluid port of the fluid container is in an undocked condition from the docking interface of the dock; and a second condition where the actuator is fastened to the complementary guiding mechanism of the fluid container; and  a receiver for accommodating the fluid container in the undocked condition and in the engaged condition;

wherein the receiver comprises an asymmetric enraging mechanism configured to cooperate with a complementary asymmetric engaging mechanism of the fluid container, such that the fluid container may be accommodated in only one spatial orientation with respect to the dock.

26. The dock of claim 25, wherein the guiding mechanism is further configured to guide disengagement of the fluid container from the dock from the engaged condition to the undocked condition.

27. The dock of claim 25, configured to guide the fluid container from the undocked condition to the engaged condition in a direction normal to the docking interface of the dock.

28. The dock of claim 25, configured to guide the fluid container from the engaged condition to the undocked condition in a direction normal to the docking interface of the dock.

29. The dock of claim 25, wherein the asymmetric engaging mechanism is tapered towards the docking interface of the dock, such that the asymmetric engaging mechanism is configured to: provide clearance between the asymmetric engaging mechanism of the dock and the complementary asymmetric engaging mechanism of the fluid container for enabling a user to engage the complementary asymmetric engaging mechanism of the fluid container with the asymmetric engaging mechanism of the dock; and to guide the fluid container from the undocked condition into the engaged condition into the docking interface.

30. The dock of claim 25, further comprising:

a fluid port comprising a coupling adapted to connect to a corresponding coupling on the fluid container to connect the fluid container in fluidic communication with the fluid circulation system associated with the engine.

31. The dock of claim 25, further comprising:

an interface for data communication with a data provider of the fluid container.

32. The dock of claim 25, wherein the reservoir holds a lubricant for a lubricant circulation system associated with the engine.

33. A dock for a replaceable fluid container for an engine, wherein the fluid container includes a fluid reservoir, and a fluid port including a coupling adapted to couple with a fluid circulation system associated with the engine, the dock comprising:

a fastening mechanism configured to cooperate with the fluid container such that, as the fluid container is inserted into the dock, the fastening mechanism acts first to seat the fluid container in the dock in an undocked condition and then, as the fluid container is inserted further into the dock, the fastening mechanism acts to bring the fluid container into an enraged condition in which the fluid container is docked with a docking interface of the dock;

wherein the fastening mechanism comprises an actuator configured to cooperate with a complementary fastening mechanism of the fluid container, the actuator being configured to be operated between:

a first condition where the actuator abuts with the complementary fastening mechanism of the fluid container to hold the fluid container such that the fluid port of the fluid container is in the undocked condition from the docking interface of the dock;

a second condition where the actuator is fastened to the complementary fastening mechanism of the fluid container; and a receiver for accommodating the fluid container in the undocked condition and in the engaged condition;

wherein the receiver comprises: an asymmetric engaging mechanism configured to cooperate with a complementary asymmetric engaging mechanism of the fluid container, such that the fluid container may be accommodated in only one spatial orientation with respect to the dock.

34. The dock of claim 33, wherein the asymmetric engaging mechanism comprises: a first number of patterns provided in one part of the receiver; and a second, different, number of patterns provided in another part of the receiver.

35. The dock of claim 33, wherein the asymmetric engaging mechanism comprises: at least one pattern with a first shape provided in one part of the receiver; and at least one pattern with a second, different, shape provided in another part of the receiver.

36. The dock of claim 33, wherein the asymmetric engaging mechanism comprises: at least one pattern with a first dimension provided in one part of the receiver; and at least one pattern with a second, different, dimension provided in another part of the receiver.

37. The dock of claim 33, wherein the asymmetric engaging mechanism is tapered towards the docking interface of the dock, such that the asymmetric engaging mechanism is configured to: provide clearance between the asymmetric engaging mechanism of the dock and the complementary asymmetric engaging mechanism of the fluid container for enabling a user to engage the complementary asymmetric engaging mechanism of the fluid container with the asymmetric engaging mechanism of the dock; and to guide the fluid container from the undocked condition into the engaged condition into the docking interface.

\* \* \* \* \*